US012671068B2

(12) United States Patent
Stewart et al.

(10) Patent No.: US 12,671,068 B2
(45) Date of Patent: Jun. 30, 2026

(54) TIMING CONTROL FOR ANALYTICAL INSTRUMENT

(71) Applicant: Thermo Fisher Scientific (Bremen) GmbH, Bremen (DE)

(72) Inventors: Hamish Stewart, Bremen (DE); Bernd Hagedorn, Bremen (DE); Johannes Petzoltd, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 359 days.

(21) Appl. No.: 18/408,447

(22) Filed: Jan. 9, 2024

(65) Prior Publication Data

US 2024/0234114 A1 Jul. 11, 2024

(30) Foreign Application Priority Data

Jan. 10, 2023 (GB) ..................................... 2300327
Nov. 14, 2023 (GB) ..................................... 2317433

(51) Int. Cl.
*H01J 49/00* (2006.01)
*H01J 49/40* (2006.01)
*H01J 49/42* (2006.01)

(52) U.S. Cl.
CPC .......... *H01J 49/0031* (2013.01); *H01J 49/40* (2013.01); *H01J 49/4215* (2013.01)

(58) Field of Classification Search
CPC ..... H01J 49/0031; H01J 49/40; H01J 49/4215
See application file for complete search history.

(56) References Cited

U.S. PATENT DOCUMENTS

| | | | |
|---|---|---|---|
| 5,886,346 A | 3/1999 | Makarov |
| 8,716,659 B2 | 5/2014 | Kawana |
| 9,136,101 B2 | 9/2015 | Grinfeld et al. |
| 10,128,099 B1 | 11/2018 | Schwartz et al. |
| 10,699,888 B2 | 6/2020 | Giannakopulos et al. |

(Continued)

FOREIGN PATENT DOCUMENTS

| | | |
|---|---|---|
| EP | 2315233 B1 | 4/2011 |
| WO | 2008081334 A2 | 7/2008 |

OTHER PUBLICATIONS

Combined Search and Examination Report under Sections 17 and 18(3) from GB 2300327.0 dated Jul. 7, 2023, 6 pages.

(Continued)

*Primary Examiner* — Nicole M Ippolito
(74) *Attorney, Agent, or Firm* — Klarquist Sparkman, LLP

(57) ABSTRACT

An analytical instrument comprises a first mass filter and a mass filter arranged downstream of the first mass filter. A method of operating the instrument comprises operating the first mass filter in a first mode of operation in which the first mass filter transmits ions having mass-to-charge ratios within a first mass-to-charge ratio (m/z) window, wherein the first m/z window is centred at a first m/z; switching, at a first time, the first mass filter to a second mode of operation in which the first mass filter transmits ions having mass-to-charge ratios within a second different m/z window, wherein the second m/z window is centred at a second different m/z; and beginning accumulating ions in an ion store and/or beginning acquiring mass spectral data of ions at a second time, wherein the second time follows the first time after a delay time.

20 Claims, 10 Drawing Sheets

(56) References Cited

U.S. PATENT DOCUMENTS

| | | | | |
|---|---|---|---|---|
| 11,315,781 | B2 | 4/2022 | Fujii et al. | |
| 2019/0385832 | A1* | 12/2019 | Oser | H01J 49/429 |
| 2022/0344145 | A1* | 10/2022 | Jarrold | H01J 49/4265 |
| 2024/0393301 | A1* | 11/2024 | Fort | G01N 27/623 |

OTHER PUBLICATIONS

Zhang et al., "High-Throughput Proteomics," Annual Review of Analytical Chemistry, 7: 427-454 (Jun. 2014).

* cited by examiner

TIMING CONTROL FOR ANALYTICAL INSTRUMENT

CROSS REFERENCE TO RELATED APPLICATIONS

This application claims priority from application GB 2300327.0, filed Jan. 10, 2023, and application GB 2317433.7, filed Nov. 14, 2023. The entire disclosure of applications GB 2300327.0 and GB 2317433.7 are incorporated herein by reference.

FIELD OF THE INVENTION

The present invention relates to the field of mass spectrometry and mass spectrometers.

BACKGROUND

Typical tandem mass spectrometry workflows involve a series of MS/MS (or "MS2") scans where ions from an ion source are captured by one or more ion guides, ions within a narrow m/z range are isolated using an isolation device such as a resolving quadrupole, then fragmented and mass analysed (see, e.g., Z. Zhang, S. Wu, D. L. Stenoien, and L. Pasa-Toli, High-Throughput Proteomics, Annual Review of Analytical Chemistry, 2014, 7(1), 427-454). Fragment ion m/z and intensity are used to identify the original parent ion.

Between scans, the isolation target is changed, which requires time both for switching of the RF and DC voltages applied to the quadrupole, and changing potentials of other ion guides in the instrument to maximise transmission of the ions. There is also then additional time required for ions to travel across and out of the device. These delays impose a period during which ions are not available to be measured. When an instrument is operating at a high repetition rate, these delays can occupy a substantial proportion of the total cycle time, and can thus limit the repetition rate, duty cycle and sensitivity of the instrument.

It is believed that there remains scope for improvements to apparatus and methods for mass analysis.

SUMMARY

A first aspect provides a method of operating an analytical instrument, such as a mass spectrometer, the analytical instrument comprising:

a first mass filter; and a mass analyser arranged downstream of the first mass filter;

the method comprising:

operating the first mass filter in a mode of operation in which the first mass filter transmits ions having mass-to-charge ratios within a first mass-to-charge ratio (m/z) window, wherein the first m/z window is centred at a first m/z;

switching, at a first time, the first mass filter to a mode of operation in which the first mass filter transmits ions having mass-to-charge ratios within a second different m/z window, wherein the second m/z window is centred at a second different m/z; and beginning accumulating ions in an ion store and/or beginning acquisition of mass spectral data at a second time, wherein the second time follows the first time after a delay time;

wherein the method further comprises:

determining whether a difference between the second m/z and the first m/z is less than a threshold m/z difference;

when it is determined that the difference between the second m/z and the first m/z is less than the threshold m/z difference: setting the delay time to a first delay time; and when it is determined that the difference between the second m/z and the first m/z is greater than the threshold m/z difference: setting the delay time to a second different delay time.

Embodiments provide a method of operating an analytical instrument in which a mass filter's centre m/z is switched one or more times between plural different target m/z values. For each target m/z, ions may be accumulated in an ion store (ion trap) for a target accumulation time, and the accumulated packet of ions may then be (optionally fragmented and) mass analysed. Alternatively, for each target m/z, mass spectral data of (optionally fragmented) ions may be acquired for a target acquisition time.

After switching the target m/z of the mass filter (e.g. from a first m/z to a second different m/z), the instrument implements a delay time before beginning accumulating ions in the ion store (e.g. by opening the ion store's ion gate) or before beginning acquiring mass spectral data. The delay time may be (at least some of the time) selected such that ion transmission into the ion store or into the mass analyser is approximately constant after the delay time, e.g. to ensure that a desired number of ions is precisely and consistently accumulated in the ion store.

In accordance with embodiments, the delay time is variable, depending on the size of the m/z transition (e.g. depending on the difference between the second m/z and the first m/z). In particular, when the size of the m/z transition is less than a threshold m/z difference, a first delay time is used, and when the size of the m/z transition is greater than the threshold m/z difference, a second different delay time is used. As is described in more detail below, this allows shorter delay times to be used whenever possible, thereby increasing the duty cycle and sensitivity of the instrument.

It will be appreciated that embodiments provide improved apparatus and methods for mass analysis.

The analytical instrument may be a mass spectrometer, and may comprise an ion source, where ions are generated from a sample in the ion source.

The instrument comprises a first mass filter arranged downstream of the ion source. The first mass filter may be configured to receive ions from the ion source (optionally via one or more intermediate devices of the instrument). The first mass filter may be configured to filter received ions according to their mass to charge ratio. The first mass filter may be any suitable mass filter, such as a quadrupole mass filter.

The instrument may also comprise a second mass filter such as a second quadrupole mass filter. The second mass filter may be arranged downstream of the ion source and upstream of the first mass filter, e.g. arranged and configured to reduce contamination on the first mass filter. The second mass filter may be configured to filter received ions according to their mass to charge ratio and to pass the filtered ions to the first mass filter. The second mass filter may be a relatively low-resolution "pre-filter" (e.g. capable of generating isolation windows with widths of the order of hundreds of Th), while the first mass filter may be a relatively high-resolution analytical mass filter (e.g. capable of generating isolation windows with widths of the order of a few Th or less).

In general, the instrument may comprise one or more first devices, such as a second mass filter and/or an RF ion guide, arranged downstream of the ion source and upstream of the first mass filter. The first device may be configured to transmit ions having mass-to-charge ratios within a third mass-to-charge ratio (m/z) window, wherein a width of the third mass-to-charge ratio (m/z) window is greater than a width of the first and/or second mass-to-charge ratio (m/z) window.

The instrument comprises one or more mass analysers arranged downstream of the first mass filter. The mass analyser(s) is configured to analyse ions, e.g. so as to determine a mass spectrum of the ions. The mass analyser(s) can comprise any suitable type(s) of mass analyser, such as in particular an ion trap mass analyser, a time-of-flight mass analyser, and/or a mass analyser comprising a quadrupole mass filter.

Where present, the ion trap mass analyser may be an electrostatic orbital trap mass analyser. The mass analyser may have an inner electrode arranged along an axis and two outer detection electrodes spaced apart along the axis and surrounding the inner electrode. Ions trapped within the mass analyser may oscillate with a frequency which may depend on their mass-to-charge ratio and which can be detected using image current detection. The ions may perform substantially harmonic oscillations along the axis in an electrostatic field whilst orbiting around the inner electrode. The mass analyser may be an Orbitrap™ mass analyser from Thermo Fisher Scientific. Further details of an Orbitrap™ mass analyser can be found, for example, in U.S. Pat. No. 5,886,346.

Where present, the time-of-flight mass analyser may be any suitable type of time-of-flight mass analyser, such as in particular a multireflection time-of-flight mass analyser. Ions within the mass analyser may oscillate between a pair of ion mirrors, until they reach a detector. Ions may travel through the mass analyser with a time-of-flight determined by the mass to charge ratio of the ions. The multireflection time-of-flight mass analyser can optionally be of the tilted-mirror type described in U.S. Pat. No. 9,136,101.

In some embodiments, the instrument includes both an electrostatic ion trap mass analyser, and a time-of-flight mass analyser, e.g. as described in U.S. Pat. No. 10,699,888.

The instrument may optionally comprise an ion gate arranged downstream of the first mass filter and upstream of the mass analyser(s).

The instrument may optionally comprise an ion store arranged downstream of the ion gate and upstream of the mass analyser(s). Ions accumulated in the ion store may be passed to the mass analyser and then analysed by the mass analyser, e.g. so as to determine a mass spectrum of the ions.

Where present, the ion store may be configured to receive ions from the ion source via the mass filter(s). The ion store may be an ion trap, e.g. any suitable ion trap, such as a linear ion trap or a curved linear ion trap (C-trap). The ion store can also be formed from a combination of plural ion traps. The ion store may be used to cool and/or fragment the accumulated ions prior to injecting them into the mass analyser. The ion store may be configured such that ions can be ejected from the ion store to the mass analyser in a pulsed manner.

The ion store may have an axis and may be operable to eject ions from the ion store orthogonally to the axis. An example of a suitable ion trap in the case of injection into an electrostatic orbital trap mass analyser is a curved linear trap (C-Trap), as described for example in WO 2008/081334. Additionally or alternatively, the ion store may be operable to eject ions from the ion trap in a direction parallel to the axis to the mass analyser. In some embodiments, ions can be ejected either to a first (e.g. electrostatic ion trap) mass analyser, or to a second (e.g. time-of-flight) mass analyser, e.g. as described in U.S. Pat. No. 10,699,888.

In these embodiments, the ion gate may be coupled to and associated with the ion store, and may be configured to control an accumulation time of ions in the ion store. This may be done by operating the gate in an accumulation mode for a desired amount of time, while otherwise operating the gate in a closed mode.

The instrument may comprise only a single gate associated with the ion store, or multiple (e.g. two) gates associated with the ion store, such as an entrance gate and an exit gate to the ion store. The ion store may be operated in the accumulation mode by operating the entrance gate in an open mode, and the ion store may be operated in the closed mode by operating the entrance gate in a closed mode. Operating the ion store in the accumulation mode may comprise operating the exit gate in a closed mode.

Alternatively, the ion gate may be configured to control an acquisition time of ions by the mass analyser, e.g. by operating the gate in an open mode to allow ions through to the mass analyser for a desired amount of time, while otherwise operating the gate in a closed mode.

The instrument may be operated in a cyclical manner, e.g. such that successive batches of ions are each accumulated in the ion store and/or such that successive sets of mass spectral data are acquired. Suitable repetition rates for the instrument are of the order of a few tens of Hz or a few hundreds of Hz.

Where the instrument comprises an ion store, each accumulated batch of ions may be passed to the mass analyser and mass analysed by the mass analyser. Alternatively, ions may be provided substantially continuously to (and mass analysed by) the mass analyser.

Each mass analysis may be an MS1 analysis, in which the ions analysed by the mass analyser are not (deliberately) fragmented, and/or an MS2 (or "MS/MS") analysis whereby the ions are fragmented or reacted, such that the ions analysed by the mass analyser are fragment ions.

The method may comprise switching the first mass filter's centre m/z one or more times between plural different target mass to charge ratios (i.e. where the plural target mass to charge ratios include the first m/z and the second m/z). The first mass filter's centre m/z may be switched at most once in each instrument cycle, e.g. such that each batch of ions or each acquisition comprises ions having mass to charge ratios approximately equal to one of the target mass to charge ratios (or fragments thereof).

The method may comprise performing a data independent acquisition (DIA) method, in which the plural different target mass to charge ratios span an m/z range of interest. Alternatively, the method may comprise performing a data dependent acquisition (DDA) method, in which the plural different target mass to charge ratios are determined from a MS1 survey scan (and do not necessarily span an m/z range of interest).

For each target m/z, the first mass filter is operated in a mode of operation in which it transmits ions having mass-to-charge ratios within a m/z window centred at the target m/z. The width of the m/z window may be constant for all of the plural different target mass to charge ratios (and so the width of the first mass-to-charge ratio (m/z) window may be the same as the width of the second mass-to-charge ratio (m/z) window), or the window width may vary e.g. in dependence on the centre m/z of each window. In embodiments, each m/z window has a width≥about 0.4 Th, ≥about 1 Th, ≥about 2 Th, ≥about 3 Th, ≥about 5 Th, or ≥about 10 Th. The width of the first mass filter's m/z window may be no greater than about 50 Th.

The method may also comprise switching the second mass filter's centre m/z when the first mass filter's centre m/z is changed, e.g. once per instrument cycle between each of the plural different target mass to charge ratios.

For each target m/z, the second mass filter may be operated in a mode of operation in which it transmits ions having mass-to-charge ratios within a m/z window centred at the target m/z. Thus, for example, the method may comprise operating the second mass filter in a mode of operation in which the second mass filter transmits ions having mass-to-charge ratios within a fourth mass-to-charge ratio (m/z) window centred at the first m/z; and switching, at the first time, the second mass filter to a mode of operation in which the second mass filter transmits ions having mass-to-charge ratios within a fourth different m/z window centred at the second m/z.

The width of the second mass filter's m/z window may be constant for all of the plural different target mass to charge ratios (and so the width of the third mass-to-charge ratio (m/z) window may be the same as the width of the fourth mass-to-charge ratio (m/z) window), or may vary e.g. in dependence on the centre m/z of each window. In embodiments, the width of the second mass filter's m/z window is ≥about 50 Th, ≥about 100 Th, ≥about 200 Th, ≥about 300 Th, ≥about 400 Th, or ≥about 500 Th.

For each target m/z, the method may comprise accumulating ions in the ion store (ion trap) for a target accumulation time. The target accumulation time may be determined for each batch of ions based on a desired number of ions to be accumulated in the ion store and an estimation of the ion current or ion flux being received by the ion store. Each target accumulation time may be of the order of a few ms.

Alternatively, for each target m/z, the method may comprise acquiring mass spectral data of ions during a target acquisition time. Each target acquisition time may be of the order of a few ms.

The method may comprise, in each instrument cycle, beginning accumulating ions in the ion store (e.g. by opening the ion gate to begin accumulating ions in the ion store) or beginning acquiring mass spectral data (e.g. by opening an ion gate to begin allowing ions into the mass analyser or by controlling the mass analyser to begin data acquisition) at a second time that follows a first time. The first time is the time at which the first (and/or second) mass filter is switched from one target m/z to the next (and so e.g. from the first m/z to the second m/z). The second time follows the first time after a delay time has elapsed.

The method may comprise, in each instrument cycle, finishing accumulating ions in the ion store (e.g. by closing the ion gate to stop accumulating ions in the ion store) or finishing acquiring mass spectral data at a third time, wherein the third time corresponds to the second time plus the target accumulation time or the target acquisition time.

The delay time is variable, depending on the size of the m/z transition between the current target m/z and the previous target m/z (and so, e.g., depending on the difference between the second m/z and the first m/z). In particular, the method comprises determining whether the m/z transition is less than (or, equivalently, greater than) a threshold m/z difference. When the size of the m/z transition is less than the threshold m/z difference, a first delay time is used, and when the size of the m/z transition is greater than the threshold m/z difference, a second different delay time is used. The first delay time may be less than the second delay time.

The threshold m/z difference may be is (i) less than or equal to the width of the third mass-to-charge ratio (m/z) window; (ii) less than or equal to 80% of the width of the third mass-to-charge ratio (m/z) window; (iii) less than or equal to 60% of the width of the third mass-to-charge ratio (m/z) window; (iv) less than or equal to 50% of the width of the third mass-to-charge ratio (m/z) window; or (v) less than or equal to 40% of the width of the third mass-to-charge ratio (m/z) window. In particular embodiments, the threshold m/z difference is about equal to 50% of the width of the third mass-to-charge ratio (m/z) window.

Thus, a first shorter delay time may be implemented when the m/z transition is less than about half of the second mass filter's (or, in general, the first device's) isolation window width. In this case, the target m/z will be efficiently transmitted by the second mass filter (first device) both before and after the target m/z is switched. This means that ions with the target m/z will already have migrated from the second mass filter (first device) to the first mass filter when the m/z transition is made, and also that there may be less need to wait for the second mass filter (first device) to settle before beginning accumulation or acquisition, thereby allowing a shorter delay time, and increasing the duty cycle and sensitivity of the instrument. The first delay time may be sufficient to allow the first mass filter to settle after switching its transmission window. The first delay time may be of the order of, e.g., a few hundreds of μs or around 1 ms.

A second longer delay time may be implemented when the m/z transition exceeds about half of the second mass filter's (the first device's) isolation window width. In this case, the target m/z will not be efficiently transmitted by the second mass filter (first device) after the target m/z is switched, and so additional delay time is needed to allow ions with the target m/z to migrate from the second mass filter (first device) to the first mass filter. The second delay time may be sufficient to allow the second mass filter to settle after switching its transmission window. The second delay time may be of the order of, e.g., a few ms.

The first delay time may be constant with varying target accumulation time for the ion store. In contrast, the second delay time may vary in dependence on the target accumulation time for the ion store.

For example, the method may comprise, when it is determined that the difference between the second m/z and the first m/z is greater than the threshold m/z difference:

- determining whether a target accumulation time for the ion store is greater than a threshold accumulation time;
- when it is determined that the target accumulation time is less than the threshold accumulation time: setting the second delay time to a first value; and
- when it is determined that the target accumulation time is greater than the threshold accumulation time: setting the second delay time to a second different value, wherein the second value is less than the first value.

Similarly, the first delay time may be constant with varying target acquisition time, and the second delay time may vary in dependence on the target acquisition time.

For example, the method may comprise, when it is determined that the difference between the second m/z and the first m/z is greater than the threshold m/z difference:

- determining whether a target acquisition time is greater than a threshold acquisition time;

when it is determined that the target acquisition time is less than the threshold acquisition time: setting the second delay time to a first value; and when it is determined that the target acquisition time is greater than the threshold acquisition time: setting the second delay time to a second different value, wherein the second value is less than the first value.

According to another aspect, there is provided a method of operating an analytical instrument, the analytical instrument comprising:

a first mass filter; and a mass analyser arranged downstream of the first mass filter;

the method comprising:

operating the first mass filter in a first mode of operation in which the first mass filter transmits ions having mass-to-charge ratios within a first mass-to-charge ratio (m/z) window, wherein the first m/z window is centred at a first m/z;

switching, at a first time, the first mass filter to a second mode of operation in which the first mass filter transmits ions having mass-to-charge ratios within a second different m/z window, wherein the second m/z window is centred at a second different m/z; and beginning accumulating ions in an ion store and/or beginning acquiring mass spectral data at a second time, wherein the second time follows the first time after a delay time;

wherein the method further comprises:

(i) determining whether a target accumulation time for the ion store is greater than a threshold accumulation time;

(ii) when it is determined that the target accumulation time is less than the threshold accumulation time: setting the second delay time to a first value; and (iii) when it is determined that the target accumulation time is greater than the threshold accumulation time: setting the second delay time to a second different value;

or wherein the method further comprises:

(i) determining whether a target acquisition time is greater than a threshold acquisition time;

(ii) when it is determined that the target acquisition time is less than the threshold acquisition time: setting the second delay time to a first value; and (iii) when it is determined that the target acquisition time is greater than the threshold acquisition time: setting the second delay time to a second different value.

This aspect can, and in embodiments does, include any one or more or each of the optional features described herein. Thus, for example, the second different value may be less than the first value.

In these aspects and embodiments, the method may comprise, when it is determined that the target accumulation time is less than the threshold accumulation time: setting the second delay time to a constant delay time. The method may comprise, when it is determined that the target acquisition time is less than the threshold acquisition time: setting the second delay time to a constant delay time. That is, the first value delay time may be constant. This constant delay time may be sufficient to allow the second mass filter to settle after switching its transmission window, e.g. of the order of a few ms.

The method may comprise, when it is determined that the target accumulation time is greater than the threshold accumulation time: setting the second delay time to a delay time that decreases with increasing target accumulation time. The method may comprise, when it is determined that the target acquisition time is greater than the threshold acquisition time: setting the second delay time to a delay time that decreases with increasing target acquisition time.

The instrument may be operated in a cyclical manner (as described above), and the threshold accumulation time and/or the threshold acquisition time may correspond to a difference between a total cycle time for the instrument and the first delay time value.

Thus, according to these aspects and embodiments, it has been recognised that the desired accumulation or acquisition time can be greater than the time that would conventionally be available in each cycle (which may e.g. correspond to the difference between the instrument cycle time and the delay time that is sufficient to allow the second mass filter to settle). Where such an accumulation or acquisition time is desired, the delay time is reduced e.g. linearly with increasing accumulation or acquisition time, so as to allow additional accumulation or acquisition time. Although this means that accumulation or acquisition will begin before the instrument has settled (so that ion transmission into the ion store will not be constant), the benefits of increased duty cycle and sensitivity can outweigh the loss in quantitative accuracy. Furthermore, the inventors have recognised that the quantitative accuracy can at least in part be recovered by estimating the change in ion transmission into the ion store or mass analyser with time, and e.g. using this to calibrate any estimation of the ion current or ion flux received by the ion store or mass analyser.

In embodiments, the first and/or second delay times may vary in dependence on the second m/z. For example, lower m/z ions may require less time to travel through the instrument to the ion store than higher m/z ions, and so their accumulation or acquisition may begin sooner, thereby increasing the duty cycle and sensitivity of the instrument.

In embodiments, the first and/or second delay times may vary in dependence on whether the second m/z is greater than or smaller than the first m/z. For example, an increase in the amplitude(s) of the voltage(s) applied to the mass filter(s) may require less settling time than a corresponding decrease.

A further aspect provides a non-transitory computer readable storage medium storing computer software code which when executed on a processor performs the method(s) described above.

A further aspect provides a control system for an analytical instrument such as a mass spectrometer, the control system configured to cause the analytical instrument to perform the method(s) described above.

A further aspect provides an analytical instrument, such as a mass spectrometer, comprising the control system described above.

A further aspect provides an analytical instrument, such as a mass spectrometer, comprising:

a first mass filter;

a mass analyser arranged downstream of the first mass filter; and a control system configured to:

operate the first mass filter in a first mode of operation in which the first mass filter transmits ions having mass-to-charge ratios within a first mass-to-charge ratio (m/z) window, wherein the first m/z window is centred at a first m/z;

switch, at a first time, the first mass filter to a second mode of operation in which the first mass filter transmits ions having mass-to-charge ratios within a second different m/z window, wherein the second m/z window is centred at a second different m/z; and begin accumulating ions in the ion store and/or begin acquiring mass spectral data at a second time, wherein the second time follows the first time after a delay time;

wherein the control system is further configured to:

(i) determine whether a difference between the second m/z and the first m/z is less than a threshold m/z difference; (ii) when it is determined that the difference between the second m/z and the first m/z is less than the threshold m/z difference: set the delay time to a first delay time; and (iii) when it is determined that the difference between the second m/z and the first m/z is greater than the threshold m/z difference: set the delay time to a second different delay time; and/or (iv) determine whether a target accumulation or acquisition time is greater than a threshold time; (v) when it is determined that the target accumulation or acquisition time is less than the threshold time: set the second delay time to a first value; and (vi) when it is determined that the target accumulation or acquisition time is greater than the threshold time: set the second delay time to a second different value.

This aspect can, and in embodiments does, include any one or more or each of the optional features described for the method above and/or elsewhere herein.

DESCRIPTION OF THE DRAWINGS

Various embodiments will now be described in more detail with reference to the accompanying Figures, in which.

DETAILED DESCRIPTION

Figure 1:
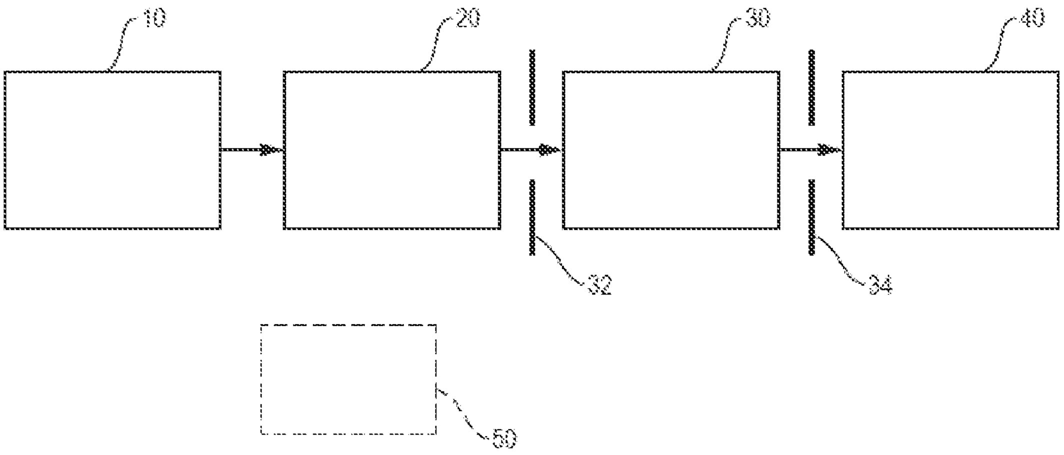
FIG. 1 shows schematically a mass spectrometer in accordance with embodiments.

FIG. 1 illustrates schematically an analytical instrument, such as a mass spectrometer, that may be operated in accordance with embodiments. As shown in FIG. 1, the instrument includes an ion source 10, a mass filter 20, an ion store in the form of an ion trap 30, and a mass analyser 40.

The ion source 10 is configured to generate ions from a sample. The ion source 10 can be any suitable continuous or pulsed ion source, such as an electrospray ionisation (ESI) ion source, a MALDI ion source, and atmospheric pressure ionisation (API) ion source, a plasma ion source, an electron ionisation ion source, a chemical ionisation ion source, and so on. More than one ion source may be provided and used. The ions may be any suitable type of ions to be analysed, e.g. small and large organic molecules, biomolecules, DNA, RNA, proteins, peptides, fragments thereof and the like.

The ion source 10 may optionally be coupled to a separation device such as a liquid chromatography separation device or a capillary electrophoresis separation device (not shown), such that the sample which is ionised in the ion source 10 comes from the separation device.

The mass filter 20 is arranged downstream of the ion source 10, and is configured to receive ions from the ion source 10. The mass filter 20 is configured to filter the received ions according to their mass to charge ratio (m/z). The mass filter 20 may be configured such that received ions having m/z within an m/z transmission window of the mass filter are onwardly transmitted by the mass filter, while received ions having m/z outside the m/z transmission window are attenuated by the mass filter, i.e. are not onwardly transmitted by the mass filter. The width and/or the centre m/z of the transmission window may be controllable (variable), e.g. by suitable control of RF and/or DC voltage(s) applied to electrodes of the mass filter 20. Thus, for example, the mass filter 20 may be operable in a transmission mode of operation, whereby most or all ions within a relatively wide m/z window are onwardly transmitted by the mass filter 20, and a filtering mode of operation, whereby only ions within a relatively narrow m/z window (centred at a desired m/z) are onwardly transmitted by the mass filter 20. The mass filter 20 can be any suitable type of mass filter, such as a quadrupole mass filter.

The ion store (ion trap) 30 is arranged downstream of the mass filter 20 and is configured to receive and accumulate ions from the ion source 10 (via the mass filter 20). The ion store 30 can comprise any suitable type of ion trap, such as one or more multipole (e.g. quadrupole) ion trap(s).

In some embodiments, the ion trap 30 is elongated in an axial direction (thereby defining a trap axis) in which the ions enter the trap. Ions may be trapped radially in the trap 30 by applying RF voltage(s) to trapping (e.g. rod) electrodes of the trap. The ion trap 30 may be or may include a curved linear ion trap (C-Trap), i.e. where the trapping rod electrodes are curved. The ion trap 30 may be or may include any other suitable type of ion trap, such as for example a linear ion trap.

The ion trap 30 includes an entrance lens or gate 32 and an exit lens or gate 34. The entrance gate 32 can be operated in an open mode, in which ions (from the ion source 10) can pass the entrance gate and enter the ion trap 30, or a closed mode in which ions (from the ion source 10) cannot pass the entrance gate 32 and do not enter the ion trap 30. When the entrance gate 32 is operated in its closed mode, ions already within the ion trap 30 are not able to leave the ion trap via the entrance gate 32. Similarly, the exit gate 34 can be operated in an open mode, in which ions can pass the exit gate and leave the ion trap 30, or a closed mode in which ions cannot pass the exit gate and do not leave the ion trap. The entrance gate 32 (and the exit gate 34) can be closed or opened by applying a suitable voltage to the entrance gate 32 (or to the exit gate 34).

Ions from the ion source 10 can be accumulated in the ion trap 30 by operating the exit gate 34 in its closed mode, while operating the entrance gate 32 in its open mode. After a desired ion fill time of ions into the ion trap 30, the entrance gate 32 can be closed (by altering the voltage applied to the entrance gate 32) such that ions cannot pass out of the trap 30 and such that ions from the ion source 10 can no longer enter the ion trap 30. Thus, the instrument is configured such that ions can be accumulated in the ion trap 30 with an adjustable accumulation time (fill time). By controlling the fill time of ions into the trap, where the flux of ions into the trap 30 is known or can be approximated, the total number of ions accumulated in the ion trap 30 can be controlled.

Once accumulated in the ion trap 30, ions within the trap can be ejected into the mass analyser 40. Ions may be ejected from the ion trap 30 in an axial direction, or the ions may be ejected from the trap 30 in a direction orthogonal to the axis of the trap (orthogonal ejection), for example by applying one or more suitable DC voltages to the ion trap 30.

The mass analyser 40 is arranged downstream of the ion trap 30 and is configured to receive ions from the ion trap 30. The mass analyser 40 is configured to analyse the ions so as to determine their mass to charge ratio (m/z) and/or mass, i.e. to produce a mass spectrum of the ions. The mass analyser 40 may be an ion trap mass analyser, such as an electrostatic orbital trap, and more specifically an Orbitrap™ FT mass analyser as made by Thermo Fisher Scientific. Alternatively, the mass analyser 40 may be a time-of-flight (ToF) mass analyser, such as a multi-reflecting time-of-flight (MR-ToF) mass analyser.

It should be noted that FIG. 1 is merely schematic, and that the instrument can, and in embodiments does, include any number of one or more additional components. For example, the instrument may include a single mass analyser, or more than one (e.g. two) mass analysers.

The instrument may include a collision or reaction cell, which may e.g. form part of the ion trap 30, or which may be arranged between the ion trap 30 and mass analyser 40. Ions collected in the ion trap 30 may either be ejected to the mass analyser 40 without entering the collision or reaction cell, or the ions can be transmitted to the collision or reaction cell for processing before the processed ions are returned to the ion trap 30 for subsequent ejection to the mass analyser 40. The processing may comprise, for example, fragmenting the ions by collisions with a collision gas and/or a reagent in the collision cell, or further cooling the ions by collisions with a gas at lower energies that do cause the ions to fragment.

In general, the instrument may include one or more ion transfer stage(s) arranged between any of the illustrated components, e.g. including an atmospheric pressure interface and/or one or more ion guides, lenses and/or other ion optical devices configured such that some or all of the ions can be transmitted appropriately through the instrument. The ion transfer stage(s) may include any suitable number and configuration of ion optical devices, for example optionally including one or more RF and/or multipole ion guides, one or more ion guides for cooling ions, one or more mass selective ion guides, and so on.

As also shown in FIG. 1, the instrument is under the control of a control unit 50, such as an appropriately programmed computer, which controls the operation of various components of the instrument and, for example, sets the voltages to be applied to the various components of the instrument. The control unit 50 may also receive and process data from various components including the analyser(s), and e.g. perform Fourier transformation on detected signals. The control unit 50 is configured, amongst other things, to determine the settings (e.g. ion trap 30 fill time, etc.) for the injection of ions into the mass analyser 40 for analytical scans.

The instrument may be operated such that successive batches of ions from the ion source 10 are each analysed by the mass analyser 40. Each batch of ions is firstly accumulated in the ion trap 30, and then the accumulated ions (or e.g. fragment ions derived from the accumulated ions) are injected into the mass analyser 40.

It can be desirable that each batch of ions analysed by the mass analyser 40 includes as many ions as possible, e.g. so as to improve the statistics of the mass spectrum. However, undesirable space charge effects can occur at relatively high ion concentrations and can limit mass resolution and mass accuracy. Therefore, the total number of ions accumulated in the ion trap 30 is controlled to optimise the number of ions injected into the mass analyser 40 to be below, but as close as possible to, a limit for the mass analyser 40 such as a space-charge limit for the mass analyser 40. The total number of ions accumulated in the ion trap 30 may also or instead be controlled to be below a limit for the ion trap 30 such as the space-charge limit for the ion trap 30. Typically, between $5\times10^3$ and $1\times10^6$ elementary charges should be stored, such as between $1\times10^4$ and $1\times10^6$, or between $1\times10^5$ and $5\times10^5$.

However, it can be the case that the flux of ions from the ion source 10 is highly variable. This is particularly the case where the ion source 10 is coupled to a separation device such as a liquid chromatography or capillary electrophoresis device, where the ion flux from the ion source 10 can vary over time by several order of magnitudes.

Therefore, embodiments use so-called automatic gain control (AGC) techniques to precisely control the total number of ions accumulated in the ion trap 30 despite a variable flux of ions into the trap 30. These techniques typically rely on an accurate and reliable real-time estimation of the present ion current or ion flux being received by the ion trap 30. Then, by controlling the filling time T of the ion trap 30, the total number of ions or the total amount of charge accumulated in the trap 30 (and injected into the mass analyser 40) can be suitably controlled.

Thus, for each batch of ions, a target accumulation time T may be determined based on an estimation of the present ion current or ion flux being received by the ion trap 30, and ions may be accumulated in the ion trap 30 for an amount of time equal to the target accumulation time T.

Figure 2:
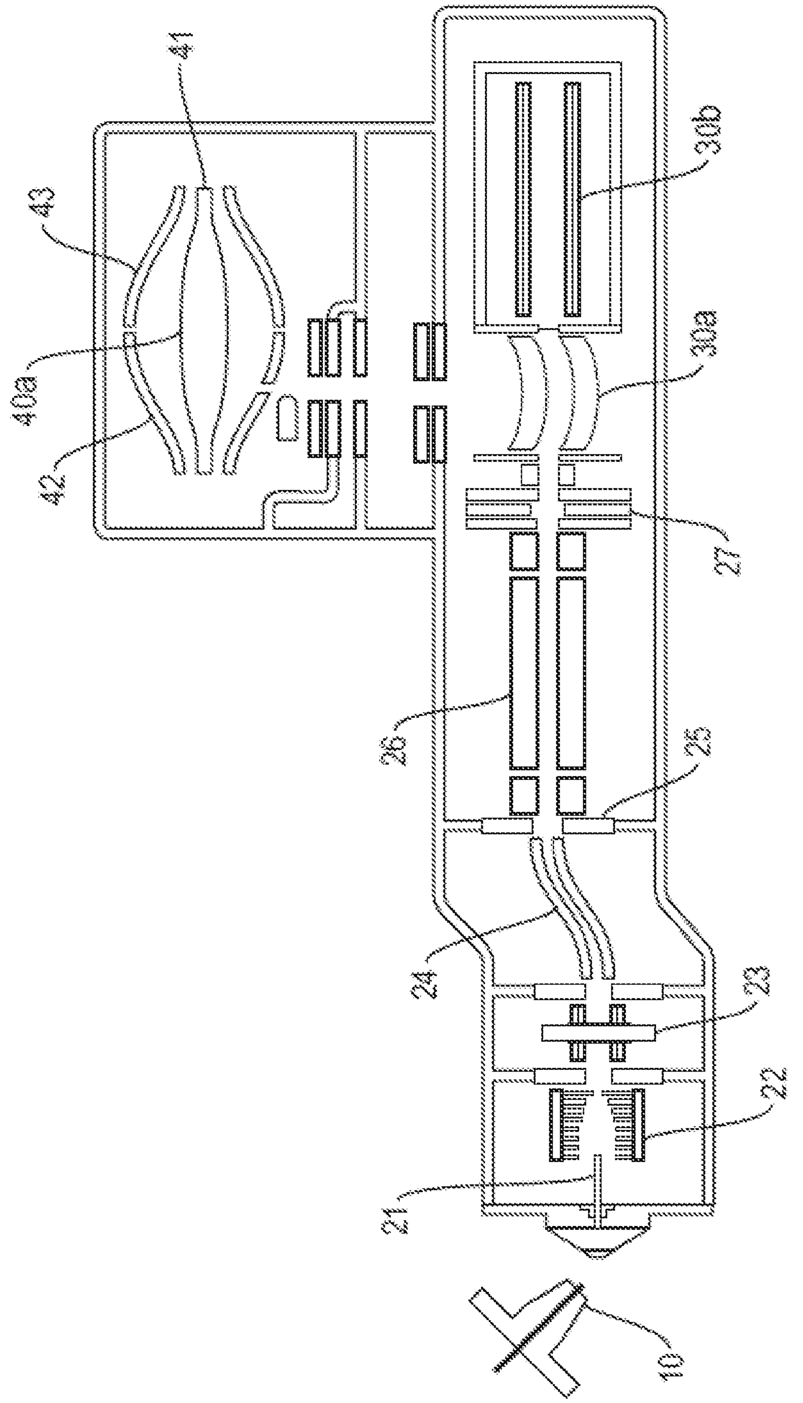
FIG. 2 shows schematically detail of a mass spectrometer in accordance with embodiments.
Figure 3:
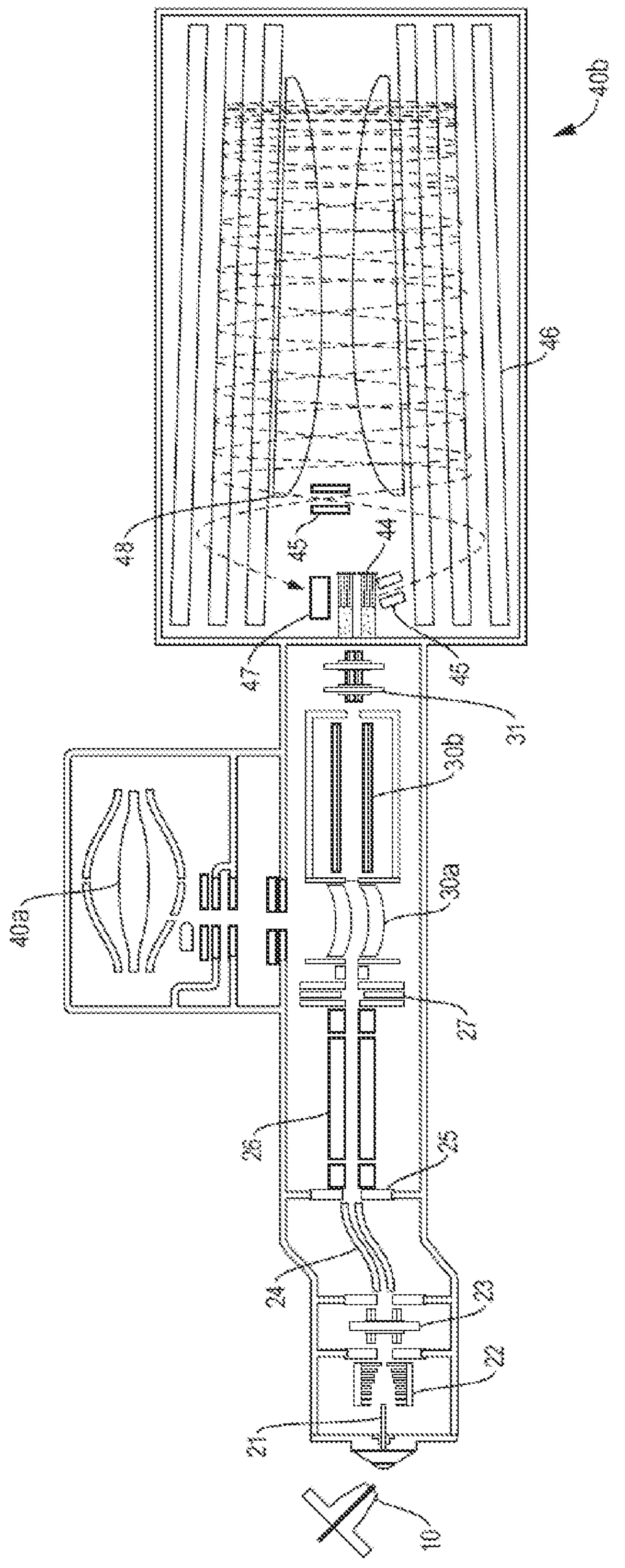
FIG. 3 shows schematically detail of a mass spectrometer in accordance with embodiments.

FIGS. 2 and 3 show in more detail two example instruments that may be operated in accordance with embodiments. It will be understood that the instruments shown in FIGS. 2 and 3 are non-limiting examples, and that numerous variations are possible.

In the embodiment depicted in FIG. 2, the instrument's ion source 10 is an electrospray ionisation (ESI) ion source. The instrument includes a vacuum interface, which includes a transfer tube 21, an ion funnel 22, a quadrupole pre-filter ion guide 23, and a "bent flatapole" ion guide 24. The bent flatapole ion guide 24 may be of the design described in U.S. Pat. No. 9,536,722.

The instrument also includes a mass filter in the form of a quadrupole mass filter 26, an ion trap 30*a* in the form of a curved linear ion trap ("C-Trap"), and a collision cell 30*b* in the form of an ion routing multipole collision cell ("IRM"). Ions from the ion source 10 can be accumulated in the C-Trap 30*a* and/or collision cell 30*b* by opening and closing a gating electrode located in a charge detector assembly 27, which is arranged between the C-Trap 30*a* and the mass filter 26.

The instrument also includes a mass analyser 40*a* in the form of an orbital ion trap mass analyser. As shown in FIG. 2, the orbital trap 40*a* comprises an inner electrode 41 elongated along the orbital trap axis and a split pair of outer electrodes 42, 43 which surround the inner electrode 41 and define therebetween a trapping volume in which ions are trapped and oscillate by orbiting around the inner electrode 41 to which is applied a trapping voltage whilst oscillating back and forth along the axis of the trap. The pair of outer electrodes 42, 43 function as detection electrodes to detect an image current induced by the oscillation of the ions in the trapping volume and thereby provide a detected signal.

The outer electrodes 42, 43 typically function as a differential pair of detection electrodes and are coupled to respective inputs of a differential amplifier (not shown in FIG. 2), which in turn forms part of a digital data acquisition system to receive the detected signal. The detected signal can be processed using Fourier transformation to obtain a mass spectrum of ions within the trap.

Once accumulated in the ion trap 30*a* and/or collision cell 30*b*, ions can be ejected into the mass analyser 40*a*. To do this, the ions may be ejected from the trap 30*a* in a direction orthogonal to the axis of the trap (orthogonal ejection), for example by applying one or more suitable DC voltages to the ion trap 30*a*. The ions may be injected into the mass analyser 40*a* via one or more lenses and a deflector electrode. The mass analyser 40*a* is arranged downstream of the ion trap 30*a* and is configured to receive ions from the ion trap 30*a* (via the one or more lenses and the deflector electrode).

The collision or reaction cell 30*b* is arranged downstream of the ion trap 30*a*. Ions collected in the ion trap 30*a* can either be ejected orthogonally to the mass analyser 40*a* without entering the collision or reaction cell 30*b*, or the ions can be transmitted axially to the collision or reaction cell 30*b* for processing before returning the processed ions to the ion trap 30*a* for subsequent orthogonal ejection to the mass analyser 40*a*. The processing may comprise, for example, fragmenting the ions by collisions with a collision gas and/or a reagent in the collision cell 30*b*, or further cooling the ions by collisions with a gas at lower energies that do cause the ions to fragment.

Turning to FIG. 3, the instrument depicted in FIG. 3 is substantially similar to the instrument of FIG. 2. However, the instrument depicted in FIG. 3 includes an additional time-of-flight (ToF) mass analyser in the form of a multi-reflection time-of-flight (ToF) mass analyser 40*b*, which has been added to the rear of the instrument. This hybridized instrument is described in more detail in U.S. Pat. No. 10,699,888. In the instrument depicted in FIG. 3, the analyser is of the tilted-mirror type described in U.S. Pat. No. 9,136,101, but it will be understood that any type of ToF analyser could be used.

As shown in FIG. 3, the instrument includes a multipole ion guide 31 to allow ions to be transferred from the collision cell 30*b* to the time-of-flight mass analyser 40*b*. The time-of-flight mass analyser 40*b* includes an extraction trap 44, whereby ions are delivered from the collision cell 30*b* to the extraction trap 44 via the multipole ion guide 31. The ions are accumulated and cooled in the extraction trap 44.

The extraction trap 44 may incorporate two trapping regions, one at a relatively higher pressure for rapid ion cooling, and a second low pressure region for ion extraction. Ions are cooled in the high-pressure region and then transferred to the low-pressure region, where they are pulse ejected into the ToF analyser via a pair of deflectors 45. Ions oscillate between a pair of mirrors 46, which are tilted relative to one another so that the ion path is slowly deflected and redirected back to a detector 47. Correcting stripe electrodes 48 counter the loss of ion focus otherwise induced by the non-parallelism of the mirrors.

Typical tandem mass spectrometry workflows, such as are used in common proteomics applications, involve a series of MS/MS (or "MS2") scans where ions from the ion source 10 are captured by the vacuum interface, and a narrow mass to charge ratio (m/z) range of the ions is isolated using the resolving quadrupole 26. These isolated ions are then fragmented and mass analysed. Fragment ion m/z and intensity are used for identification of the original parent ion.

Between scans, the isolation target m/z must be changed. This requires time for both switching of RF and DC voltages applied to the resolving quadrupole 26, and changing potentials of other ion guides of the instrument to maximise transmission of the ions through the instrument. There is also then an additional time required for ions to travel across and out of the device(s). These delays impose a period during which ions are not available to be accumulated and measured. When an instrument is operating at a high repetition rate, these delays can grow to occupy a substantial proportion of the total cycle time, and can thus limit the repetition rate, duty cycle and sensitivity of the instrument.

In general, every device within the instrument whose settings are adjusted to optimise ion transmission when the target m/z is switched will provide an associated delay time for switching and subsequent ion transport. Timing delays are also required for operations where ions are accumulated, processed and analysed. Efficient setting of event timing is a fundamental problem for instrument control software. However, there is surprisingly little clear literature on the subject, perhaps because it is only recently that instrument spectral acquisition rates have approached the ion transfer times, and because most instruments incorporate a straightforward ion transport pipeline.

By way of example, in the instrument depicted in FIG. 2, ions generated by the electrospray ionisation (ESI) ion source 10 must traverse the vacuum interface, i.e. the transfer tube 21, ion funnel 22, quadrupole pre-filter ion guide 23, and bent flatapole ion guide 24, before being mass selected by the quadrupole mass filter 26, and being accumulated and/or fragmented in the ion trap 30*a* and/or collision cell 30*b*. Ions may then be passed back to the C-Trap 30*a* and pulse-ejected into the mass analyser 40*a* where they are analysed.

Figure 4:
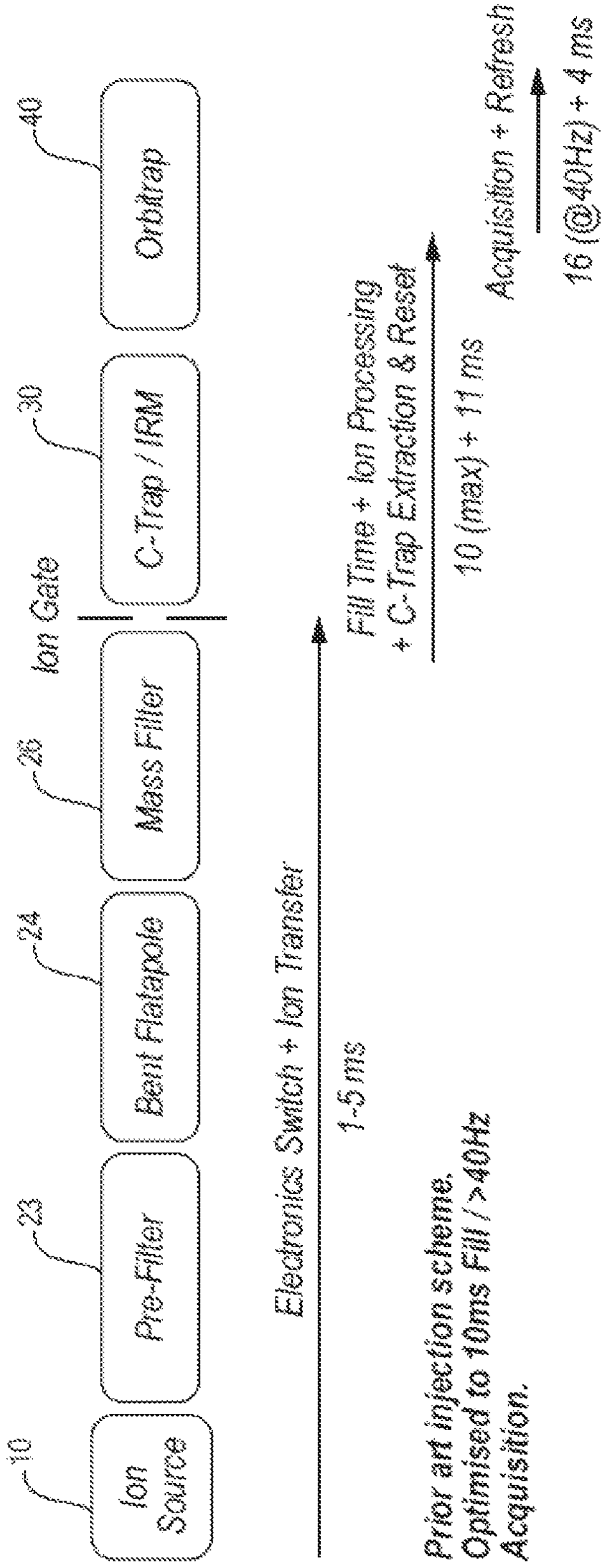
FIG. 4 (PRIOR ART)
FIG. 4 illustrates a method of operating the mass spectrometer of FIG. 2 or FIG. 3.

As is illustrated by FIG. 4, the instrument's operation is somewhat parallelised for efficiency, so that for example, ion loading and processing may occur whilst another ion packet is being analysed within the Orbitrap™ mass analyser 40*a*. The ion guides and resolving quadrupole 26 will also begin changing voltages before the C-Trap 30*a* and/or IRM 30*b* has completed processing and reset, to parallelise their 5 ms delay with the 10 ms rate-determining step of C-Trap/IRM operation. Nevertheless, the maximum duty cycle at this operation speed is at best 50%, representing a 10 ms fill time plus 10 ms of C-Trap/IRM overhead.

A recent publication (T. Arrey, H. Stewart and A. Harder, Ion Pre-Accumulation for High Speed Orbitrap Exploris Operation, Proceedings of the 70th Conference of the American Society for Mass Spectrometry, 2022) showed an improvement in this duty cycle by pre-accumulating ions in the bent flatapole 24, allowing parallelisation of ion accumulation with the C-Trap/IRM operation. However, a limitation of this method is that the quadrupole pre-filter 23 is arranged upstream of the bent-flatapole 24, and is a resolving device (e.g. in the manner described by Marriott in USRE45553E), with its own voltage transition time. Similarly, although the ion funnel 22 has very fast electronics, time is required for ion transport though this device. Thus, any large m/z target switch will involve low millisecond levels of signal instability and loss of quantitative accuracy.

Figure 5:
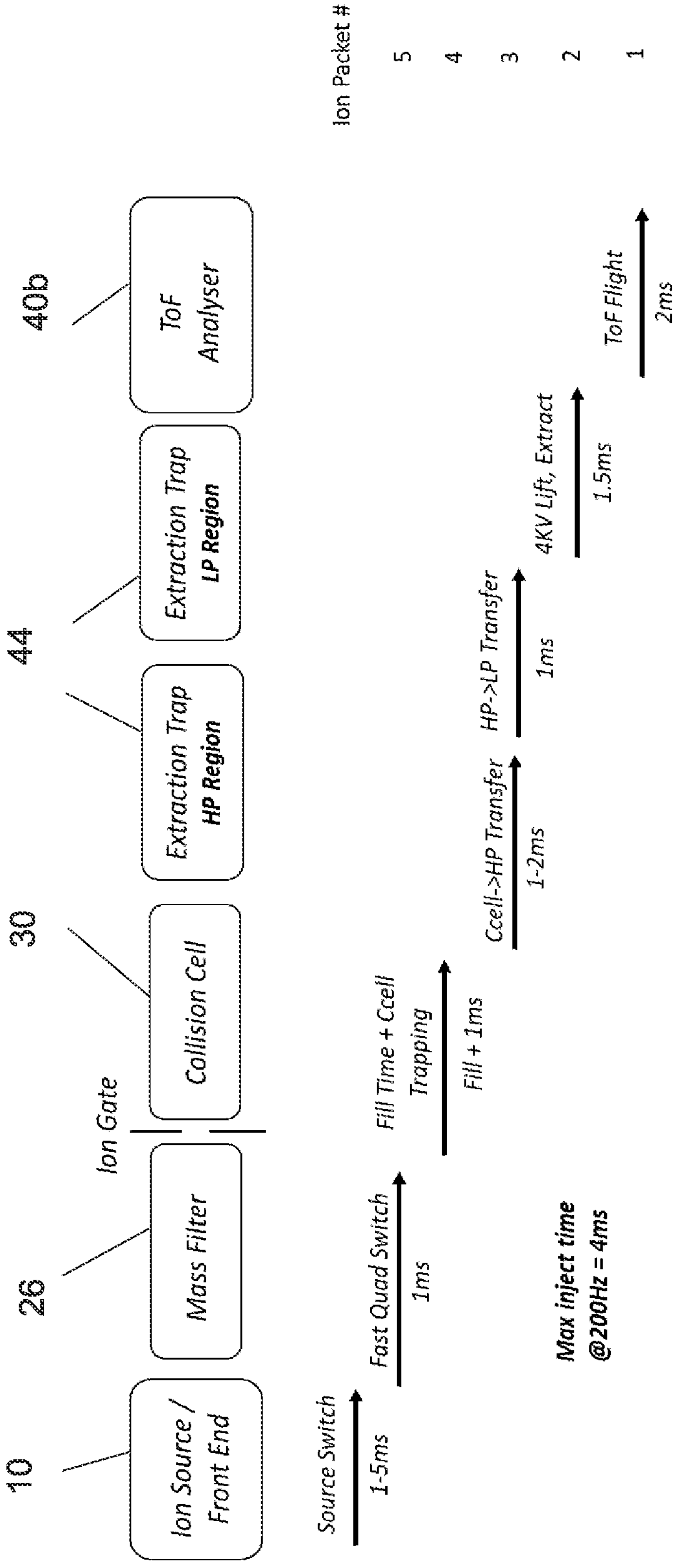
FIG. 5 illustrates a method of operating the mass spectrometer of FIG. 3.

The ToF analyser 40*b* of the instrument depicted in FIG. 3 is configured to operate much more quickly than the Orbitrap™ mass analyser 40*a*, namely at around 200 Hz (corresponding to a 5 ms cycle time), but the processing path is relatively convoluted so that ions take longer than this to enter the ToF analyser 40*b*. Consequently, high levels of parallelisation are needed, e.g. with five ion packets simultaneously processed. A version of such a timing scheme for the instrument depicted in FIG. 3 is shown in FIG. 5. Even with fast quadrupole electronics able to handle most mass transitions within 1 ms, the rest of the front-end ion guides and their ion traversal times become the rate-limiting step as soon as the mass switch exceeds their (relatively broad) transmission windows.

The inventors have recognised that a problem remains with the prolonged time requirements for electronic switching and ion traversal of front-end ion guides, as well as the wastage of signal from a proportion of ions that are successfully transmitted during that delay period.

Figure 6:
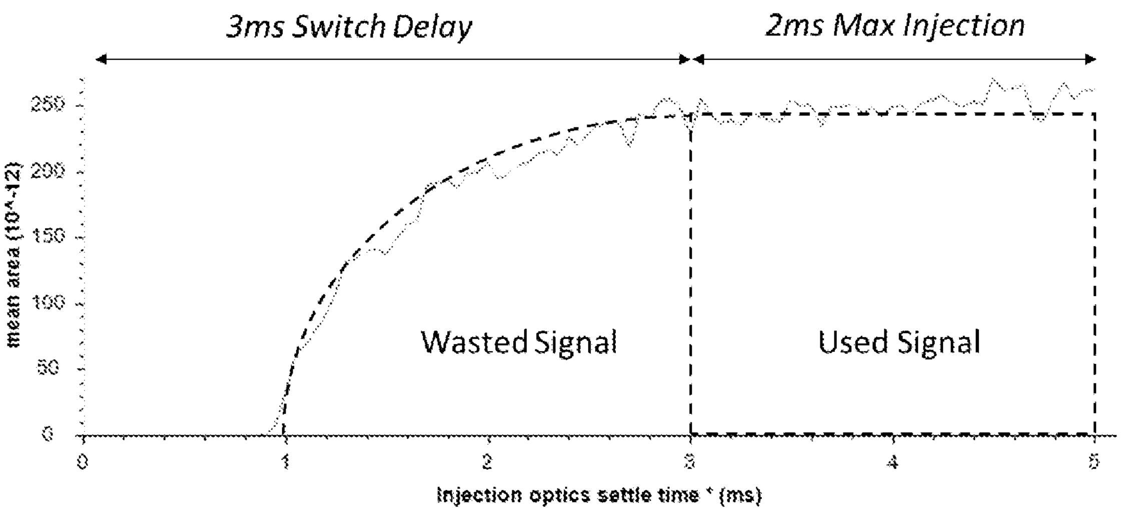
FIG. 6 shows a plot of the transmission of m/z 922 ions over time following switching the instrument of FIG. 3 from transmitting m/z 195 ions to transmitting m/z 922 ions.

For the instrument depicted in FIG. 3, an experiment was performed whereby the m/z target was switched from 195 to 922, and the m/z 922 signal was recorded with varying delay times. The results of this are shown in FIG. 6. It can be seen from FIG. 6 that it takes about 3 ms until consistent transmission is reached. For good control of often short ion injection times, it is conventionally required to inject ions at this full signal point. In other words, in conventional operation where the quadrupole 26 is switched between different m/z targets, a delay time is implemented between when the quadrupole 26 is switched and when the ion gate 32 is opened to begin ion accumulation in the ion trap 30, such that ions only enter the ion trap 30 once consistent ion transmission is achieved. However, this can limit instrument repetition rate, and means that ~40% of the signal (if 5 ms cycle/200 Hz operation is the limit) is in effect thrown away.

Furthermore, this effect is mass dependent. Large m/z switches require larger DC transitions and additional ion transport time. The required delay time for ascending and descending transitions also vary as quenching RF normally takes longer than increasing it.

Figure 7A:
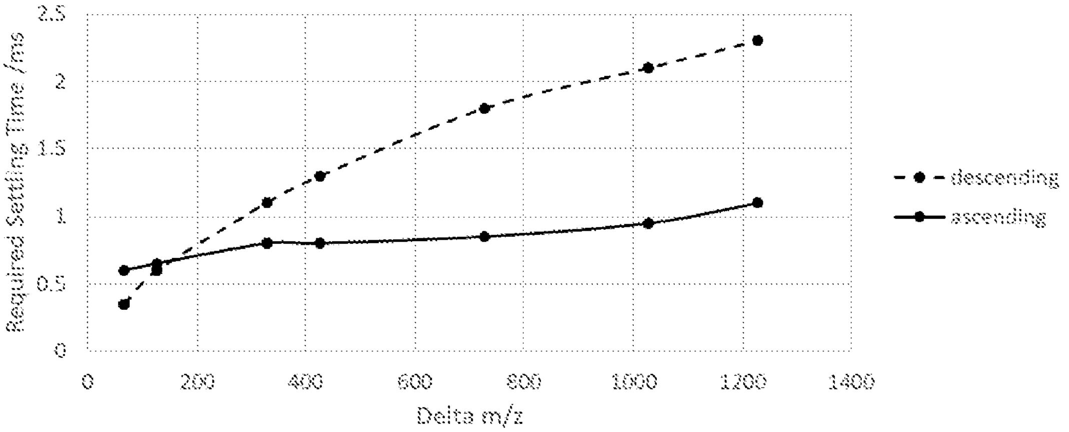
FIG. 7A shows required delay times between injections taking into account quadrupole voltage variation only.
Figure 7B:
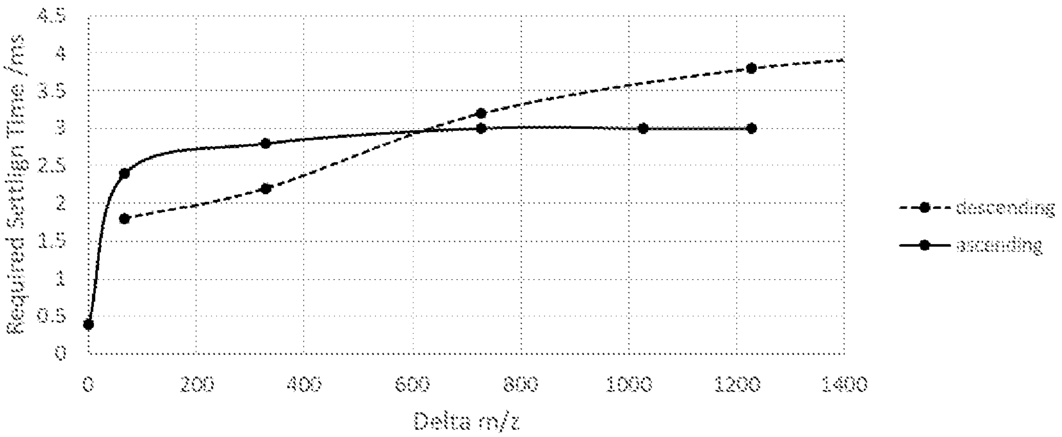
FIG. 7B shows required delay times between injections taking into account the complete instrument front-end.

FIG. 7 shows the approximate delays required for signal stabilisation for different target mass jumps, both including (FIG. 7B) and excluding (FIG. 7A) the influence of non-quadrupole front-end optics. Most notable is how for ascending jumps of the entire front-end (FIG. 7B), the delay time is flat at around 3 ms until it collapses down to <0.5 ms for very small transitions. This threshold is located where the pre-filter 23 transmission window begins to transmit both targets simultaneously without requiring a voltage modification.

Figure 8:
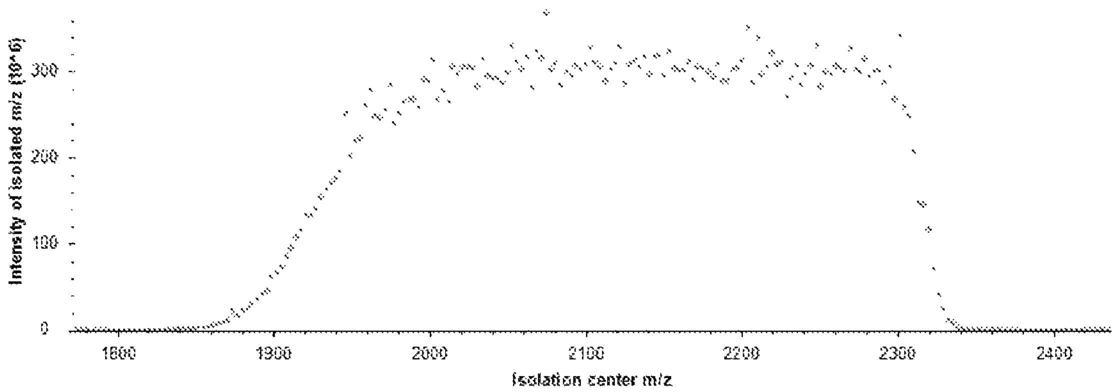
FIG. 8 shows a pre-filter transmission window centred at m/z 2122.

An example of the flat topped prefilter 23 transmission window is shown in FIG. 8. Normally this is controlled to at least the minimum width that retains full transmission (~140 Th for the instrument depicted in FIG. 2), and increases as a function of m/z. As the purpose of the pre-filter 23 is to remove as much material as possible and protect the quadrupole 26 from contamination, it is undesirable to maximise this transmission window.

Thus, it can be seen that the total required front-end settling time is approximately constant at around 3 ms for large changes in target m/z, but drops downs to <0.5 ms for small changes in target m/z. The inventors have recognised that this is primarily because small changes in m/z do not require any switching of the pre-filter's voltage settings due to the width of the pre-filter's transmission window.

According to embodiments, the front-end delay and inject times are controlled when switching target m/z such that competing requirements for duty cycle, repetition rate and quantitative accuracy are well served. The nature of the transmission bottlenecks of the front-end ion optics are taken into account, and an appropriate delay time is chosen depending on which transmission window represents the limiting step for ion transmission.

Figure 9:
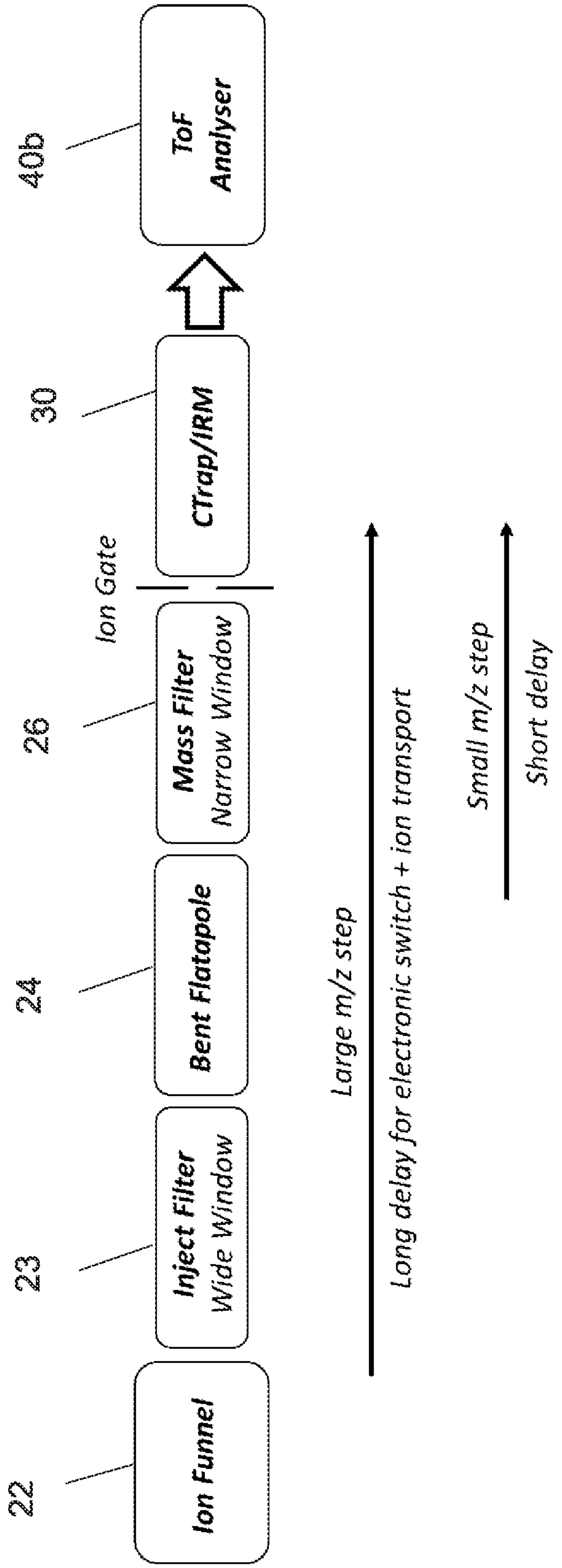
FIG. 9 illustrates a method of operating the mass spectrometer of FIG. 1 or FIG. 3 in accordance with embodiments.

For the instrument depicted in FIG. 3, there are two bottleneck transmission windows, the first being the wide window of the inject filter 23, and the second being the narrow window of the resolving quadrupole (mass filter) 26. A small change in target m/z requires a short delay, as the inject filter 23 transmission window is not exceeded, whilst a large change requires a long delay. This is illustrated by FIG. 9.

Thus, the delay time may be set to be dependent on size of the required m/z transition. For changes in m/z greater than some threshold, a larger delay time may be used, but for changes in m/z less than the threshold, a smaller delay time may be used. For example, for m/z transitions within the window of the rearmost device (i.e. the inject filter 23), a short delay (e.g. <1 ms) may be used to switch voltages, and for larger m/z transitions a longer delay (e.g. ~3 ms) may be used.

This corresponds to the delay time being a step function in m/z. Referring again to FIG. 7, this is an appropriate model especially for the case of an ascending value for the target m/z. It would be possible in other embodiments to use a more complex model to fit this data, but in practice this step-function has been found to be sufficient.

In accordance with embodiments, additionally or alternatively, a duty cycle recovery method is provided. Conventionally, the delay time is set to the level required for the ion current to plateau, with ions emerging from the front end before that time being thrown away (as shown in FIG. 6). However, where for example, the instrument repetition rate provides a 5 ms total cycle time, the maximum possible fill time would be only 2 ms, with the 3 ms delay time quickly dominating, leading to low duty cycles.

In embodiments, when the desired inject time (fill time) grows to a level that would otherwise reduce instrument repetition rate below a set minimum, the delay time is then automatically reduced to capture otherwise wasted ions and improve duty cycle. In this way, sensitivity can be improved by up to 80% at 200 Hz (albeit no longer proportionally to inject time), without sacrificing repetition rate or quantitative accuracy for the injection times below the threshold. Some accuracy may be lost for longer injections, as they start to use signal from the uncertain region. However, so long as the uncertain region isn't much larger than the plateau region, the loss will be limited and may be adjusted with post-processing.

Thus, in embodiments, the delay time is made to be dependent on the required fill time T. For example, where the instrument repetition rate provides a 5 ms total cycle time, for injection times larger than 2 ms, the delay time may be decreased as a function of fill time. This has the effect of potentially reducing quantitation accuracy (although this effect may be reduced or removed by suitable calibration), but increases duty cycle.

Figure 10:
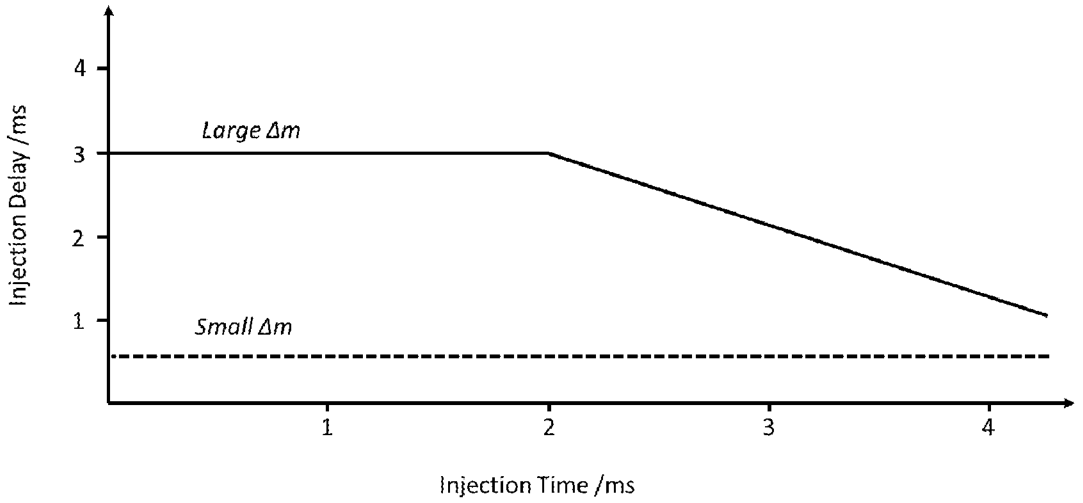
FIG. 10 shows a timing diagram for a method of operating the mass spectrometer of FIG. 1, FIG. 2 or FIG. 3 in accordance with embodiments.

FIG. 10 illustrates both the target m/z change dependent delay, and an example embodiment of how the duty cycle recovery concept may be applied. Here, there is a minimum desired repetition rate of 200 Hz (corresponding to 5 ms cycle time), a quadrupole dependent delay of 0.6 ms, and an inject filter dependent delay of 3 ms. Conventionally for larger m/z transitions (e.g. >50 Da or so) the inject time can only be 2 ms, or the 5 ms limit is breached, leaving a duty cycle of only 40%. In the method depicted in FIG. 10, however, as the desired inject time grows beyond 2 ms, the injection delay is reduced an equal amount until a minimum delay is reached.

In embodiments, for simplicity this minimum delay may be the same as the quadrupole dependent delay, e.g. 0.6 ms, or it may be deliberately set higher (e.g. ~1 ms) to both to give the resolving quadrupole 26 sufficient time to stabilise, and because the number of ions that can be gained at this point is very low, judging by the signal evolution plot of FIG. 6 that only shows ions starting to appear after 1 ms.

Figure 11:
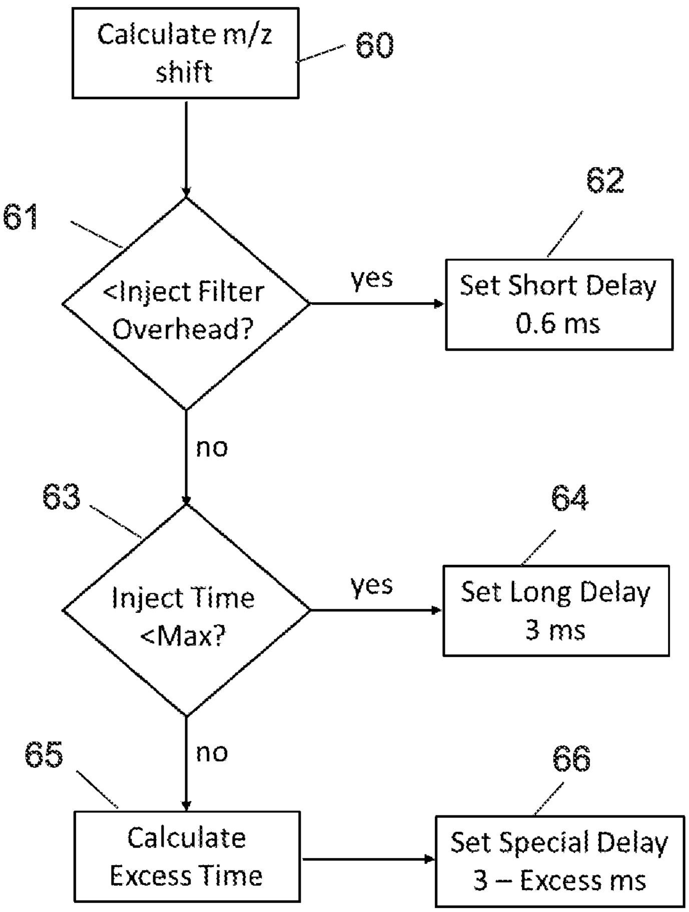
FIG. 11 illustrates a method of operating the mass spectrometer of FIG. 1, FIG. 2 or FIG. 3 in accordance with embodiments.

FIG. 11 is a flowchart with both of these described processes integrated into a method for setting an appropriate inject delay. As shown in FIG. 11, a desired m/z shift is firstly calculated (step 60), e.g. as the difference in m/z between a first m/z target and a second m/z target that immediately follows the first m/z target. Then, it is determined whether the desired m/z shift is less than a threshold m/z difference, e.g. where the threshold is based on the width of the inject filter 23 window (step 61). If this is the case, a relatively short delay time (e.g. 0.6 ms) may be used (step 62) as a delay time between switching the quadrupole 26 (and other devices in the instrument) from transmitting the first m/z target to transmitting the second m/z target and opening the ion gate 32 to begin accumulation of ions in the ion trap 30.

If the desired m/z shift is greater than the threshold, then it is determined whether the desired fill time T is less than a threshold time (step 63), where the threshold corresponds to the difference in total available cycle time and the desired longer delay time. If the desired fill time T is less than the threshold, then the delay time can be set to the desired longer delay time (e.g. 3 ms) (step 64). If the desired fill time T is greater than the threshold, then the difference between the desired fill time T and the threshold is calculated (step 65), and the delay time is set to a value corresponding to the desired longer delay time (e.g. 3 ms) minus the calculated difference (step 66).

It will be understood that embodiments provide a method in which the injection delay time is varied depending on the size of the m/z transition, taking into account the size and timing of plural successive transmission windows (e.g. of the prefilter 23 and the quadrupole 26). Embodiments also provide a duty cycle recovery process, where a delay suitable for stable signal is normally set, but is reduced down to a minimum during longer injections to recover otherwise wasted signal (at cost of some modest quantitative accuracy).

Beneficially, embodiments provide a straightforward method that allows recovery of ~40% duty cycle at high speed when it is needed, and removes the quantitative inaccuracy that would otherwise occur with short injections. It will also be appreciated that operating so that sub-maximum injections have slack in their delay time is beneficial for operation robustness and timing jitter.

Although various particular embodiments have been described above, a number of alternatives and additions are possible.

For example, a particularly useful improvement for the calculation of ion current, and thus quantitation, is to estimate the relative transmission of the recovered signal (e.g. the "Wasted Signal" portion of FIG. 6) and appropriately modify any current estimation derived from the measured signal divided by inject time. For example, referring to FIG. 6, the appearance of the m/z 922 signal may be fitted to an arc, where the integral of any injected region of that arc is approximately the recovered signal. The parameters of the arc may be varied with m/z shift or m/z to better model the ion losses. Other functions might also be used, and may be more suited to the differing m/z shifts.

Delay times may be made m/z target dependent as well as m/z transition dependent, or different delays may be applied for different broad applications such as those dealing with massively multiply charged ions, and/or anything where variation in the ion traversal time can be known.

Different delays may be used depending on whether the m/z shift is positive or negative, as negative shifts tend to require more time for electronics to quench RF.

Figure 12:
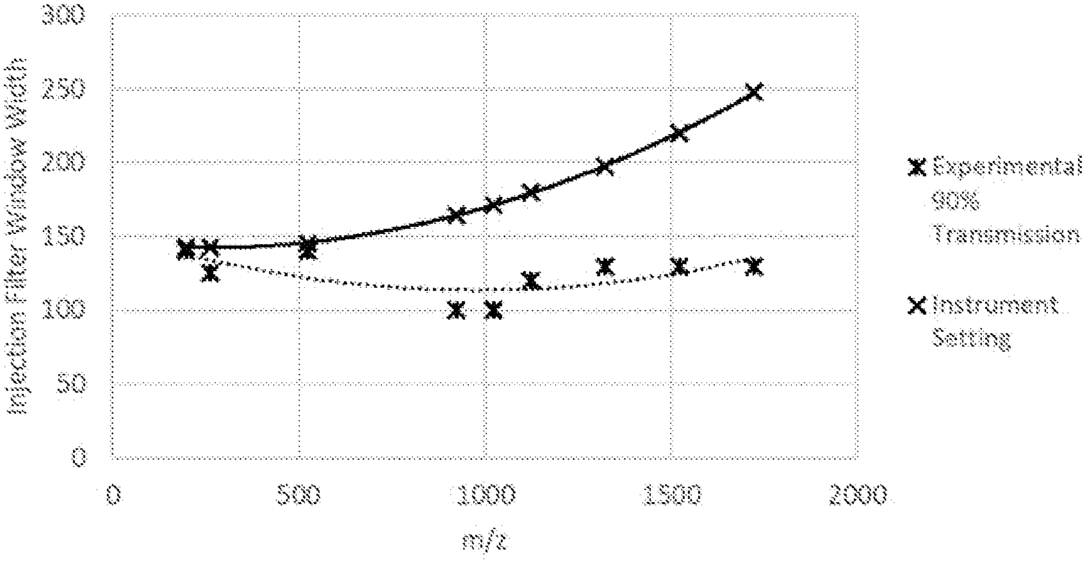
FIG. 12 shows variation of injection filter isolation window width as a function of m/z.

The m/z shift that defines the transition from short to long delay need not be fixed. It may be made dependent on knowledge of the real transmission windows being applied. When the transmission window changes, for example where the inject filter 23 transmission window is set to vary with m/z in a manner shown in FIG. 12, that may be compensated for by dynamically setting the m/z switch required to trigger the long delay.

The minimum delay time defined by the isolating quadrupole 26 transition may be set with an understanding of not only how the target ions are transmitted, but also how unwanted ions are allowed through. Often the isolating DC voltage settles down to the target, generating an expanding window; but if the electronic design produces the opposite effect, a longer delay will often be required to prevent unwanted ion co-transmission. It may for example be advantageous to separate the minimum inject time applied to large m/z transitions (during duty cycle recovery) from small m/z transitions as a consequence.

The delay variation with shift in m/z may be fitted to a curve, such as the plots in FIG. 7, as an alternative to the simple switching between two levels. Parameters of the curve or other function (spline) may be calibrated for every instrument.

There may be alternative or additional (e.g. more than two) transmission windows taken into account. In the embodiments described above, it is sufficient to ignore the ion funnel 22 and bent flatapole 24 voltage transitions, as neither are particularly rate limiting, but for other (or faster) instruments this may not be so clear cut. Thus, in some embodiments, the "first device" arranged upstream of the mass filter can be any device with a restriction on mass to charge transmission range. For example, the first device can be an RF ion guide such as the ion funnel 22 and/or the bent flatapole 24.

Another advantageous embodiment is to desynchronise the voltage switching of the front-end ion optics from one another, to match the transitions to approximately when the ions that are going to be sampled by the analyser have exited each device. This is complex as it requires a good estimation of ion traversal times through each device, but improves efficiency and shrinks the 1 ms dead spot at the beginning of FIG. 6.

Although embodiments above have been described above in terms of instruments in which ions are accumulated in an ion trap (beginning after a delay time) before being analysed by a mass analyser, various further embodiments relate to instruments in which ions are sent continuously (or very frequently) to a mass analyser and mass spectral data is accumulated over time. Such instruments include, for example, quadrupole-time-of-flight (qToF) mass spectrometers and triple quadrupole mass spectrometers. Referring again to FIG. 1, in these embodiments, the instrument does not need (and so may not include) an ion store 30. The instrument may only comprise a single ion gate 32 upstream of the mass analyser 40, or may not have any ion gate upstream of the mass analyser 40.

These instruments can make use of a delay time analogous to the above-described accumulation delay time, but where the delay is implemented between switching the target m/z and beginning acquisition of mass spectral data. For example, an ion gate may be used to prevent ions reaching the mass analyser during the delay period, the mass analyser may be controlled to only begin acquiring data after the delay period, or any data acquired during the delay period may be discarded. It will be understood that the above-described embodiments can be correspondingly adapted, where the concept of ion accumulation time is replaced by signal acquisition time.

Although the present invention has been described with reference to various embodiments, it will be understood that various changes may be made without departing from the scope of the invention as set out in the accompanying claims.

The invention claimed is:

1. A method of operating an analytical instrument, the analytical instrument comprising:

a first mass filter; and a mass analyser arranged downstream of the first mass filter;

the method comprising:

operating the first mass filter in a mode of operation in which the first mass filter transmits ions having mass-to-charge ratios within a first mass-to-charge ratio (m/z) window, wherein the first m/z window is centred at a first m/z;

switching, at a first time, the first mass filter to a mode of operation in which the first mass filter transmits ions having mass-to-charge ratios within a second different m/z window, wherein the second m/z window is centred at a second different m/z; and beginning accumulating ions in an ion store and/or beginning acquiring mass spectral data at a second time, wherein the second time follows the first time after a delay time;

wherein the method further comprises:

determining whether a difference between the second m/z and the first m/z is less than a threshold m/z difference;

when it is determined that the difference between the second m/z and the first m/z is less than the threshold m/z difference: setting the delay time to a first delay time; and when it is determined that the difference between the second m/z and the first m/z is greater than the threshold m/z difference: setting the delay time to a second different delay time.

2. The method of claim 1, wherein the first delay time is less than the second delay time.

3. The method of claim 1, wherein:

the instrument includes a first device arranged upstream of the first mass filter;

the first device is configured to transmit ions having mass-to-charge ratios within a third mass-to-charge ratio (m/z) window, wherein a width of the third mass-to-charge ratio (m/z) window is greater than a width of the first and/or second mass-to-charge ratio (m/z) window; and the threshold m/z difference is (i) less than or equal to the width of the third mass-to-charge ratio (m/z) window; (ii) less than or equal to 80% of the width of the third mass-to-charge ratio (m/z) window; (iii) less than or equal to 60% of the width of the third mass-to-charge ratio (m/z) window; (iv) less than or equal to 50% of the width of the third mass-to-charge ratio (m/z) window; or (v) less than or equal to 40% of the width of the third mass-to-charge ratio (m/z) window.

4. The method of claim 3, wherein the first device is a second mass filter or an RF ion guide.

5. The method of claim 4, wherein the first device is a second mass filter, and wherein the method further comprises switching, at the first time, the second mass filter from a mode of operation in which the second mass filter transmits ions having mass-to-charge ratios within the third mass-to-charge ratio (m/z) window centred at the first m/z to a mode of operation in which the second mass filter transmits ions having mass-to-charge ratios within a fourth m/z window centred at the second m/z.

6. The method of claim 1, wherein:

the first delay time is constant with varying target accumulation time for the ion store; and/or the first delay time is constant with varying target acquisition time.

7. The method of claim 1, wherein:

the second delay time varies in dependence on a target accumulation time for the ion store; and/or the second delay time varies in dependence on a target acquisition time.

8. The method of claim 1, wherein the method comprises, when it is determined that the difference between the second m/z and the first m/z is greater than the threshold m/z difference:

determining whether a target accumulation or acquisition time is greater than a threshold time;

when it is determined that the target accumulation or acquisition time is less than the threshold time: setting the second delay time to a first value; and when it is determined that the target accumulation or acquisition time is greater than the threshold time: setting the second delay time to a second different value, wherein the second value is less than the first value.

9. A method of operating an analytical instrument, the analytical instrument comprising:

a first mass filter; and a mass analyser arranged downstream of the first mass filter;

the method comprising:

operating the first mass filter in a first mode of operation in which the first mass filter transmits ions having mass-to-charge ratios within a first mass-to-charge ratio (m/z) window, wherein the first m/z window is centred at a first m/z;

switching, at a first time, the first mass filter to a second mode of operation in which the first mass filter transmits ions having mass-to-charge ratios within a second different m/z window, wherein the second m/z window is centred at a second different m/z; and beginning accumulating ions in an ion store and/or beginning acquiring mass spectral data at a second time, wherein the second time follows the first time after a delay time;

wherein the method further comprises:

determining whether a target accumulation or acquisition time is greater than a threshold time;

when it is determined that the target accumulation or acquisition time is less than the threshold time: setting the delay time to a first value; and when it is determined that the target accumulation or acquisition time is greater than the threshold time: setting the delay time to a second different value.

10. The method of claim 9, wherein the second different value is less than the first value.

11. The method of claim 9, comprising:

when it is determined that the target accumulation or acquisition time is less than the threshold time: setting the second delay time to a constant delay time; and when it is determined that the target accumulation or acquisition time is greater than the threshold time: setting the second delay time to a value that decreases with increasing target accumulation or acquisition time.

12. The method of claim 9, wherein the instrument is operated in a cyclical manner, and wherein the threshold or acquisition accumulation time corresponds to a difference between a total cycle time for the instrument and the first value.

13. The method of claim 1, wherein:

the first delay time varies in dependence on the second m/z; and/or the second delay time varies in dependence on the second m/z.

14. The method of claim 1, wherein:

the instrument comprises an ion gate arranged downstream of the first mass filter, and an ion store arranged downstream of the ion gate; and beginning accumulating ions in the ion store comprises opening the ion gate at the second time to begin accumulating ions in the ion store.

15. The method of claim 1, wherein the ion store is an ion trap such as a linear ion trap.

16. The method of claim 1, wherein the ion store is configured to cool and/or fragment received ions.

17. The method of claim 1, wherein the mass analyser is arranged downstream of the ion store, and wherein the method comprises accumulating ions in the ion store for the target accumulation time, and then passing ions from the ion store to the mass analyser for analysis.

18. The method of claim 17, wherein the mass analyser is an electrostatic ion trap mass analyser or a time-of-flight mass analyser.

19. The method of claim 1, wherein the mass analyser is a time-of-flight (ToF) mass analyser or comprises a quadrupole mass filter.

20. An analytical instrument comprising:

a first mass filter;

a mass analyser arranged downstream of the first mass filter; and a control system configured to:

operate the first mass filter in a first mode of operation in which the first mass filter transmits ions having mass-to-charge ratios within a first mass-to-charge ratio (m/z) window, wherein the first m/z window is centred at a first m/z;

switch, at a first time, the first mass filter to a second mode of operation in which the first mass filter transmits ions having mass-to-charge ratios within a second different m/z window, wherein the second m/z window is centred at a second different m/z; and begin accumulating ions in an ion store and/or begin acquiring mass spectral data at a second time, wherein the second time follows the first time after a delay time;

wherein the control system is further configured to:

(i) determine whether a difference between the second m/z and the first m/z is less than a threshold m/z difference; (ii) when it is determined that the difference between the second m/z and the first m/z is less than the threshold m/z difference: set the delay time to a first delay time; and (iii) when it is determined that the difference between the second m/z and the first m/z is greater than the threshold m/z difference: set the delay time to a second different delay time; and/or (iv) determine whether a target accumulation or acquisition time is greater than a threshold time; (v) when it is determined that the target accumulation or acquisition time is less than the threshold time: set the delay time to a first value; and (vi) when it is determined that the target accumulation or acquisition time is greater than the threshold time: set the delay time to a second different value.

* * * * *